United States Patent
Malanin et al.

(10) Patent No.: US 12,461,964 B2
(45) Date of Patent: Nov. 4, 2025

(54) ADAPTIVE CONTENT DELIVERY SYSTEMS AND METHODS

(71) Applicant: SpeedSize Ltd, Netanya (IL)

(72) Inventors: Vladyslav Malanin, Odesa (UA); Sagi Keen Zamoshchik, Netanya (IL)

(73) Assignee: SpeedSize Ltd, Netanya (IL)

( * ) Notice: Subject to any disclaimer, the term of this patent is extended or adjusted under 35 U.S.C. 154(b) by 0 days.

(21) Appl. No.: 18/464,191

(22) Filed: Sep. 8, 2023

(65) Prior Publication Data
US 2024/0086459 A1   Mar. 14, 2024

Related U.S. Application Data

(60) Provisional application No. 63/405,104, filed on Sep. 9, 2022.

(51) Int. Cl.
*G06F 16/00* (2019.01)
*G06F 16/25* (2019.01)
*G06F 16/583* (2019.01)

(52) U.S. Cl.
CPC .......... *G06F 16/583* (2019.01); *G06F 16/254* (2019.01)

(58) Field of Classification Search
CPC .............................. G06F 16/583; G06F 16/254
See application file for complete search history.

(56) References Cited

U.S. PATENT DOCUMENTS

| | | | |
|---|---|---|---|
| 2005/0193083 A1* | 9/2005 | Han | H04L 69/329 709/213 |
| 2009/0143052 A1* | 6/2009 | Bates | G06F 16/27 715/810 |
| 2012/0303695 A1* | 11/2012 | Michel | H04L 67/5651 709/203 |
| 2014/0019590 A1* | 1/2014 | Piernot | H04L 67/565 709/217 |
| 2016/0055618 A1* | 2/2016 | Karpenko | G06T 5/73 345/619 |
| 2017/0006126 A1* | 1/2017 | Long, III | H04L 67/60 |
| 2019/0213709 A1* | 7/2019 | Meek | G06F 18/40 |

FOREIGN PATENT DOCUMENTS

WO   WO-0227516 A1 *  4/2002   ......... G06F 16/9577

* cited by examiner

*Primary Examiner* — Syed H Hasan
(74) *Attorney, Agent, or Firm* — Carr & Ferrell LLP

(57) ABSTRACT

Adaptive content delivery systems and methods are disclosed herein. An example system is configured to determine capabilities of a requesting end user system, interface with a database designed to store images characterized by criteria, select an image from the database that balances a highest quality and a smallest file size for the end user system, based on the capabilities, and provide the image to a network for delivery to the end user system.

24 Claims, 5 Drawing Sheets

ADAPTIVE CONTENT DELIVERY SYSTEMS AND METHODS

CROSS-REFERENCE TO RELATED APPLICATIONS

This non-provisional application claims the benefit and priority of U.S. Provisional patent application Ser. No. 63/405,104, filed on Sep. 9, 2022, which is hereby incorporated by reference herein in its entirety, including all references and appendices cited therein, for all purposes.

FIELD

The present application relates to content delivery networks that adapt content for delivery based on various factors, which include, but are not limited to delivering the highest quality, lowest size content.

SUMMARY

A system of one or more computers can be configured to perform particular operations or actions by virtue of having software, firmware, hardware, or a combination of them installed on the system that in operation causes or causes the system to perform the actions. One or more computer programs can be configured to perform particular operations or actions by virtue of including instructions that, when executed by a data processing apparatus, cause the apparatus to perform the actions. One general aspect includes a method for delivering optimized content. The method also includes receiving a request for an image from an end-user system. The method also includes determining the capabilities of the end-user system, including hardware and software attributes. The method also includes accessing a database storing images differentiated by format, resolution, and/or other parameters. The method also includes based on the capabilities, selecting an image from the database that aligns with the highest quality and smallest file size suitable for the end user system. The method also includes delivering the selected image to the end user system. Other embodiments of this aspect include corresponding computer systems, apparatus, and computer programs recorded on one or more computer storage devices, each configured to perform the actions of the methods.

Implementations may include one or more of the following features. The method where determining capabilities further includes recognizing a type of end-user system, such as a mobile device, laptop, or desktop. The method may include caching the delivered image for expedited future requests from similar end-user systems. Delivering the selected image further involves applying transformations based on end-user preferences.

One general aspect includes a method for adaptive content selection. The method also includes identifying a request associated with a link for content. The method also includes extracting attributes of an end-user system from the identified request. The method also includes categorizing available content in a database based on diverse criteria, including format, size, and resolution. The method also includes comparing the extracted attributes with the categorized content to determine the best-suited content. The method also includes transmitting the determined content to the end user system. Other embodiments of this aspect include corresponding computer systems, apparatus, and computer programs recorded on one or more computer storage devices, each configured to perform the actions of the methods.

Implementations may include one or more of the following features. The method where the extracted attributes include an operating system, browser type, and rendering software present on the end user system. Categorizing the available content further involves analyzing recent updates to the content. Transmitting the determined content avoids redirections, providing a streamlined user experience. Categorizing available content involves assessing content dimensions and compatibility with a range of devices. Implementations of the described techniques may include hardware, a method or process, or computer software on a computer-accessible medium.

One general aspect includes a content delivery system. The content delivery system also includes an adaptive content delivery engine configured to: interpret the capabilities of a requesting end user system, interface with a database designed to hold images characterized by multiple criteria, select an image from the database that balances the finest quality and minimal file size for the end user system, and provide the image to a network for delivery to the end user system. Other embodiments of this aspect include corresponding computer systems, apparatus, and computer programs recorded on one or more computer storage devices, each configured to perform the actions of the methods.

Implementations may include one or more of the following features. The system where the engine is additionally configured to assess network conditions and bandwidth of the end user system. The engine additionally manages content types beyond images, including video, text, and audio. The system may include a user interface that lets users or administrators modify or fine-tune the adaptive content selections. The adaptive content delivery engine is adapted to operate within a distributed network, and the adaptive content delivery engine is configured to communicate with nodes and edges of the distributed network, for efficient content dissemination. A database undergoes dynamic updates to integrate new images and purge less optimized images. The adaptive content delivery engine is additionally configured to assess network conditions and bandwidth of the end user system. The system may include a user interface that allows users to modify or fine-tune the adaptive content selections. The adaptive content delivery engine, while selecting the image, considers both the finest resolution tailored for the end user system and the most compact file size among available images. The system is designed to operate within a distributed network, aligning the adaptive content delivery mechanism with varied nodes and edges for efficient content dissemination. Implementations of the described techniques may include hardware, a method or process, or computer software on a computer-accessible medium.

BRIEF DESCRIPTION OF THE DRAWINGS

Exemplary embodiments are illustrated by way of example and not limited by the figures of the accompanying drawings, in which references indicate similar elements.

DETAILED DESCRIPTION OF EXAMPLE EMBODIMENTS

Overview

The present disclosure pertains to an advanced content delivery framework designed to optimize media distribution, such as image files, over the Internet. In some embodiments, the platform comprises three primary components: a content delivery network (CDN), an end-user system, and a network. This network can comprise a blend of public or private, wired or wireless networks, typical to those familiar with networking technologies.

Within the scope of this, multiple subsystems and engines interact. The primary role of the CDN is the distribution of digital content, which can range from webpages, multimedia streams, and images, to audio files. This distribution takes place via a backend system that distributes content to users through a web of nodes and edges. A specialized component, the adaptive content delivery engine, is integrated within the CDN. Depending on specific implementations, this engine can reside anywhere within the CDN, including its peripheral edges.

The adaptive content delivery engine can be configured to ensure that a user receives an image tailored to their specific system's capabilities (and in some instances their personal preferences). This engine dynamically assesses the characteristics of the end-user system requesting the image—be it the nature of the device (mobile, desktop, laptop) or more specific software parameters like the operating system, browser version, and other relevant software. Beyond software attributes, the engine also gauges hardware capabilities, considering factors like processing speed and image rendering capacity. An integral part of this engine's architecture is a database, which houses a plurality of versions of an image, each available in various formats, resolutions, and other parameter permutations.

In some embodiments, when an end-user interacts with a piece of content, for instance, by clicking an image link on a webpage hosted by the CDN (the type of image request is not intended to be a limiting factor), the request reaches the adaptive content delivery engine. This engine then retrieves specific attributes and parameters of the user's system. Using this data, the engine then queries its image database to find an array of suitable images, aligned with the user's system capabilities. However, the final image selection doesn't just prioritize quality or resolution; it ensures that the chosen image, among its suitable peers, possesses the smallest file size. This process guarantees that the end-user receives an image of the highest quality with the most efficient file size, thus optimizing both user experience and network efficiency.

Example Embodiments

Figure 1:
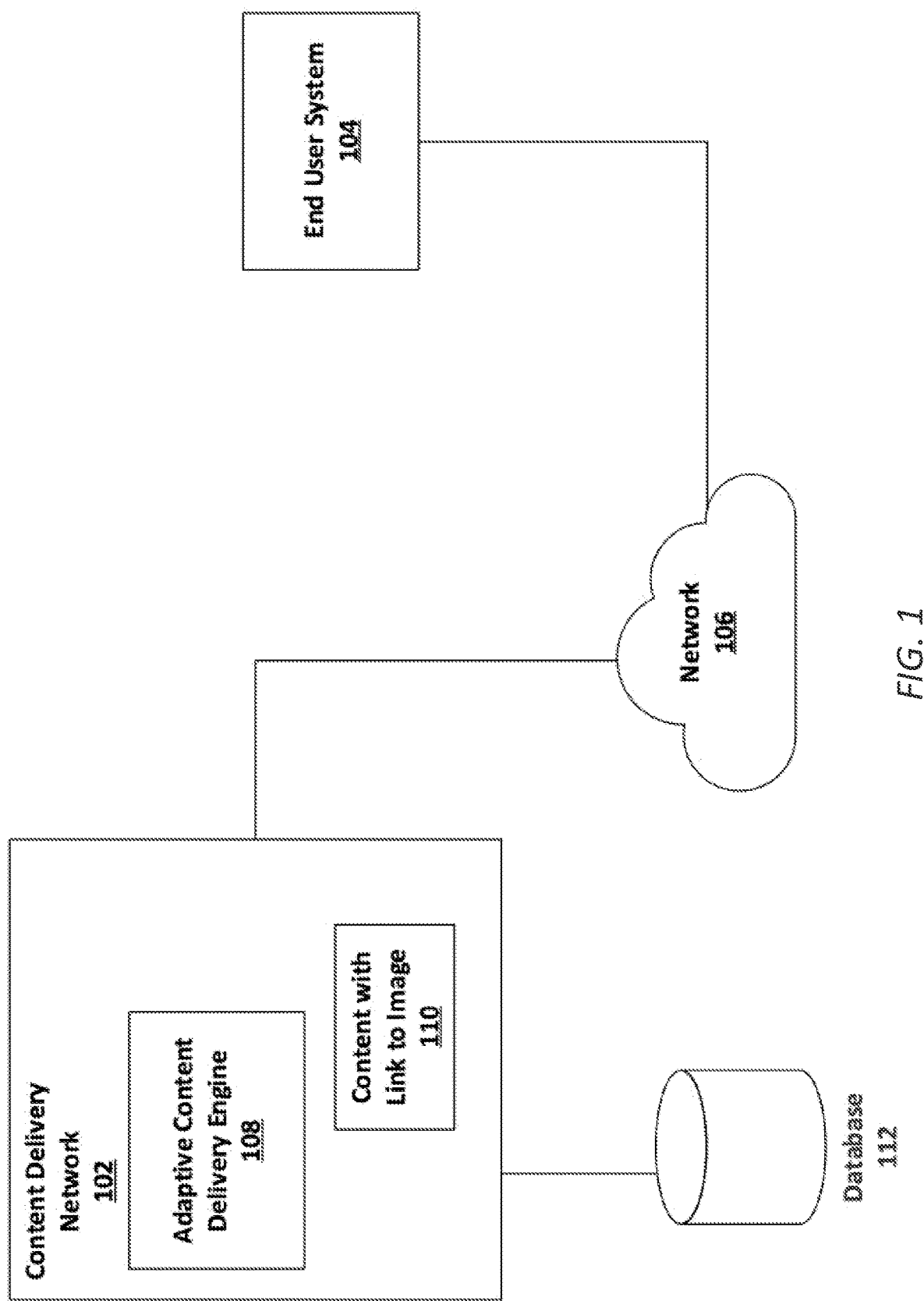
FIG. 1 is an example architectural environment where aspects of the present disclosure can be practiced.

FIG. 1 is an example architectural environment where aspects of the present disclosure can be practiced. The environment can include a content delivery network 102, an end user system 104, and a network 106. Network 106 can include any public and/or private wired and/or wireless network that would be known to one of ordinary skill in the art.

Generally, the content delivery network 102 includes any combination of systems that are configured to deliver content such as webpages, streaming media, images, audio, or other content types. In some instances, the content delivery network 102 includes a backend system that serves content to requesting users through a distributed network with nodes and edges. The content delivery network 102 can include an adaptive content delivery engine 108 that can be located anywhere inside the content delivery network 102 and in some embodiments the edges of the network. The compression disclosed herein can be integrated within any other CDN using a proxy or custom API integration, as the adaptive content delivery engine 108 has a multi-CDN strategy.

In some instances, the adaptive content delivery engine 108 can deliver images to the end user system 104. In one example, a website displays links or other indications for images. When the user clicks the link or other asset, the adaptive content delivery engine 108 can deliver an image to the user in accordance with the methods and parameters disclosed herein. While a website implementation has been described herein, this example is not limiting. The image request could alternatively be caused by the end-user system 104 requesting an image from an application, program, or any other platform.

In general, the adaptive content delivery engine 108 is configured to select an optimized image to provide to a requesting end user system, as will be discussed below. The adaptive content delivery engine 108 can assess the capabilities of the end user system 104 that is requesting the image. For example, the adaptive content delivery engine 108 can determine the type of computing device, such as a mobile device, laptop, desktop, and so forth. The adaptive content delivery engine 108 can also determine software parameters, such as what operating system, browser, or other software is present on the machine that will allow it to render images. The adaptive content delivery engine 108 can also identify hardware parameters that indicate the speed or other image rendering capabilities of the end user system 104.

Additionally, the adaptive content delivery engine 108 can maintain a database 112 of images that are accessible by links or other means (could include autoloading or downloading of an image). That is, each image hosted by the CDN can be pre-generated in many formats, resolutions, or other permutations of image parameters. Each of these various images can be categorized and stored in the database 112. However, regardless of the parameters of the image, each image will have a size. The adaptive content delivery engine 108 is configured to detect the capabilities of the end-user system and deliver to that end-user system at least one image file from the database of image files.

In more detail, the content delivery network 102 can deliver content with a link 110 to media, such as an image. For example, the content delivery network 102 hosts a webpage that has images, which are associated with individual links (such as a hyperlink). From the end user system 104, an end user clicks the link associated with a requested image. The request is received by the adaptive content delivery engine 108. The adaptive content delivery engine 108 can obtain end-user device parameters or attributes from the end-user system.

Once the data pertaining to the capabilities of the end-user system are identified, the adaptive content delivery engine 108 can select the image from the database 112 having one or more candidate images having the best resolution, file type, and/or quality for the end user system, however, finally, the selected image has the smallest file size out of the candidate images. Thus, the adaptive content delivery engine 108 delivers the highest quality, lowest file size image. In some instances, the adaptive content delivery engine 108 can assess network conditions of the CDN before selecting or creating a final size for content. For example, the adaptive content delivery engine 108 may further compress an image when the CDN is experiencing bandwidth restrictions, latency, jitter, or other deleterious performance issues.

Installation and Use

A platform of the present disclosure provides comprehensive methods for media optimization, facilitating a more efficient media delivery process. To begin, one method available to users is a media AI-optimization process. One example process within this method includes a link integration approach. Users can adjust their pre-existing media links on their endpoint to accommodate optimization. To execute this, a standardized structure is recommended, which is: 'https://cdn.provider.com/{CLIENT_ID}/{LINK}/{PARAM, PARAM, . . . }'. Here, '{CLIENT_ID}' represents the public identification key of the client, which is not a necessity if linked domains are already configured. Meanwhile, ' {LINK}' denotes the path to the media item, and '{PARAM, PARAM, . . . }' refers to various transformation parameters. These parameters encompass a range of functions, from automatic format selection to specific image resizing and cropping directives. A non-limiting list of example parameters will be set forth below.

For users who desire to embed the optimization process directly into their web infrastructure, another method of script integration can be used. This involves downloading a designated script and another accompanying file tailored for the website. The preliminary step for integration includes adding the script after the website's opening '<head>' tag. Sequentially, a secondary file can be uploaded to the website's root directory. In some embodiments, the development URL grants unrestricted access to images or, alternatively, whitelists specific user agents. The method also provides flexibility by allowing custom processing directives for individual media elements. Additionally, users can select a lazy loading feature or deregister the service worker when needed.

Another example method includes a video integration technique. This method ensures a smooth transition where any website image is substituted with instantly loading videos. To operationalize this, users should input their company identifier and integrate a given code within their development URL's '<head> </head>' segment. The user can also be prompted to clear any server-side caches if they are in operation. The platform provides diverse playback options for these videos, ranging from automated playback to designated looping sequences.

As mentioned above, various permutations of parameters can be used to define the link integration structure. Each of these parameters serves a unique role in enhancing image or media optimization and offers flexibility for various requirements.

An 'f_auto' is a parameter that is designed for the automatic delivery of the most optimal file format supported by the user's browser. This selection is based on the 'Accept' header and any other available parameters. The transformation process is not performed in real time. For the Magic-Link feature, the initial request will receive a redirect to the original image URL until a more suitable file format becomes available. The cache refresh step for the Cloud-Front distribution is set to 600 seconds. If all transformations are completed during one refresh step, subsequent requests in the next cache refresh step will receive the optimal format with a maximum cache lifetime of one year. This feature can be enabled by default.

A 'mxw_n' parameter is responsible for downscaling the image's maximum width to 'n' pixels. It maintains the image's aspect ratio by scaling to the nearest larger resolution from a predefined list of standard resolutions. The 'w_n' and 'h_n'** parameters are used for downscaling the image width ('w_n') and height ('h_n') to 'n' pixels. They are used by the platform to preserve the aspect ratio by default unless the other dimension is explicitly specified.

A 'c_auto' parameter is intended for the automatic cropping of the image's most crucial area, based on the dimensions specified in 'w_n' and 'h_n'. The cropping function maintains the original file's aspect ratio if either the width or height specified is greater than that of the original image.

Another set of parameters 's_jp2', 's_hevc', 's_jxr', 's_vp9', 's_av1' are format support parameters that provide explicit indications for the browser on supporting JPEG-2000, HEVC, JPEG-XR, VP9, and AV1 formats respectively. These are not typically transferred by the 'Accept' header in supported browsers like Safari and Chrome on iOS.

A 's_videoimg' parameter specifies that video files should be displayed in the IMG HTML element rather than as an animated image, applicable for Safari browsers. A 'ns_atwebp' parameter serves as an explicit signal for browsers that do not support animated WebP images with transparency, like Safari, even when the 'Accept' header indicates support. A 'rstrz' parameter is used to transform vector images, specifically SVGs, into a raster format where applicable.

The 'fltn' or 'fltn_COLOR' parameters are used to merge the image's transparent background with a default white color or a specified hex-code RGB color, and a 'r_contain' parameter preserves the image's aspect ratio during resizing and applies letterboxing where necessary to fit the provided dimensions. The letterbox color can be defined using the 'b_' parameter or 'b_COLOR'** which sets the image's background to a specific hex-code RGB color. An 'r_inside' parameter is similar to 'fltn', and this parameter also merges the transparent background with a default or specified hex-code RGB color.

A 'p_POSITION' parameter sets the image's position on a background when using the 'r_contain' parameter, with options such as top, right, bottom, etc. The default position is the center. An 'imdt' parameter enables transitional real-time transformation, avoiding redirects to the original file during the initial caching process.

A 'gs' parameter converts the image to grayscale, whereas the 'blr' or 'blr_N'** applies a blur effect to the image. The blurring level can be specified using a Gaussian mask sigma calculated as (1+ radius)/2, accepting a range of values between 0 and 1000. To be sure, these are example parameters and are not intended to be limiting or exhaustive.

An example integration process will be disclosed further. The installation process involves the downloading of a script that can be installed on a website, for example. The script can be added after the opening <head> tag before all the other scripts or stylesheets. This code can be placed directly into the HTML, avoiding any tag managers. It is preferred for the fastest possible initialization of our code to intercept all icons, images, and videos.

The user can upload the script file to the root folder of the website, so that it is accessible from https://yourwebsite- .com/speedsize-sw.js, as an example. To be sure, it is required by the browser security policy to let the Service Worker run on all pages. For the integration to be complete the user should ensure the Dev URL has public images (or whitelist User-Agent of the platform/engine) and the engine can access publicly or via static IPs.

A data-speedsize-params attribute can be used to provide additional specific processing instructions for the individual <img>, <video>, <picture> elements.

Example

<img src="img.jpg" data-speedsize-params="fltn_D3D3D3,w_480, h_960, c_auto" alt=" "> would pass additional params of processing for this individual element, which in this particular example are: (1) Background Color—fltn_D3D3D3—flatten, or merge the transparent background with specific color (In this case D3D3D3 (light gray). If color is not provided (just fltn), white color will be used by default); (2) Adaptive Resize—w_480, h_960—exact width and height sizes in pixels; and (3) Smart Crop—c_auto—performs an automatic content-aware crop.

It will be understood that the foregoing examples of transformation parameters are provided for descriptive purposes and are not intended to be limiting. That is, one of ordinary skill in the art will appreciate that other parameters can likewise be adapted for use.

In some instances, the engine can ignore certain elements. For example, the data-speedsize-ignore attribute can be used to indicate to the adaptive content delivery engine, an integration for individual elements to be ignored and not processed. Example: <img src="img.jpg" data-speedsize-ignore="true" alt=" ">.

The adaptive content delivery engine integration treats the original loading attribute of <img>, elements and doesn't lazyload the image if it has "eager" as a value of a loading attribute. Example: <img src="img.jpg" loading="eager" alt=" ">.

During the disintegration process for the users who have it already installed with the following HTML snippet embedded in the code of the pages:

```
if ("service Worker" in navigator) {
    navigator.service Worker.getRegistrations( ).
    then(function(registrations) {
        for (var i = 0; i < registrations.length; i += 1) {
            registrations[i].unregister( )
        }
    })
}
```

Figure 2:
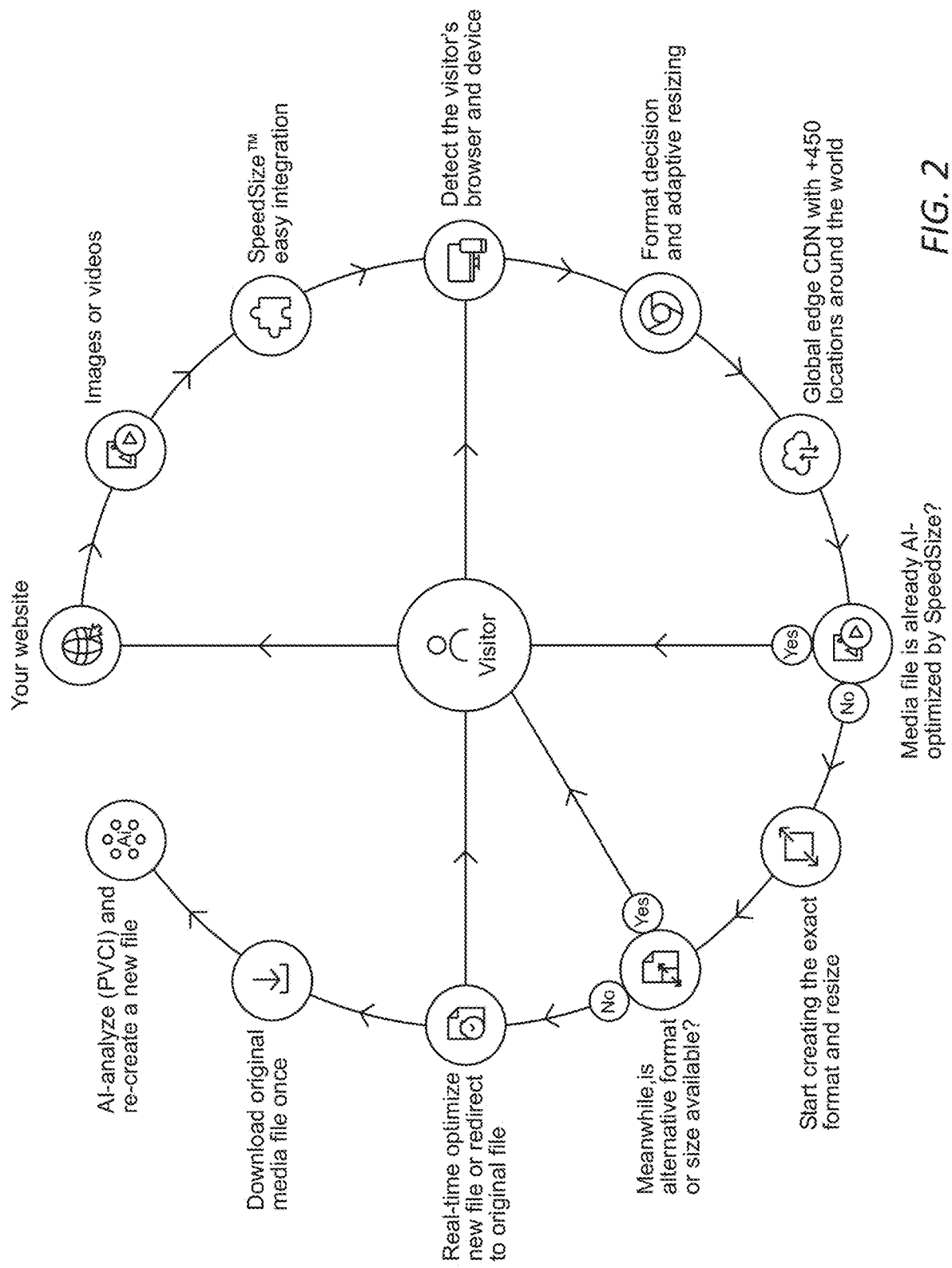
FIG. 2 is a flow diagram of an example process for the installation and use of the system disclosed herein.

FIG. 2 is a flow diagram of an example process for the installation and use of the system disclosed herein. The flow begins with the user defining the parameters of their website (or another endpoint) which are hosted by a CDN in some instances. The website is configured to host images or links to images, and these images can be requested by a user navigating the website. Also, the website is pre-configured with a script/plugin/link that logically maps to an adaptive content delivery engine of a content delivery network. This causes the detection of the user's browser and/or device when the user clicks on a link to an image referenced on the website. One example includes the user clicking on a hyperlink or embedded image.

Upon receiving a request from a user device, the parameters/capabilities of the browser and/or device are collected, which are indicative of the display capabilities of the user's device. Examples of display capabilities include display size, resolution, pixel size, color capabilities, hardware rendering rates, and the like. This information could be also determined by detecting the browser manufacturer, graphics processor model number, device manufacturer or model, or any other information that would allow the adaptive content delivery engine to determine display capabilities.

Based on the information gathered, the adaptive content delivery engine can then make a formatting decision and size calculation for the image that will be delivered to the end user system. For example, based on the device parameters gathered, there may be a specific image format (JPEG, PNG, HEIC, etc.) that renders more efficiently on the device. While example image formats have been disclosed, any and all image format conversions are contemplated.

Also, the adaptive content delivery engine will select the smallest image size available based on the image format. The adaptive content delivery engine can selectively choose any format when the size difference is negligible between various formats. However, the adaptive content delivery engine may prefer the best quality and smallest size.

The adaptive content delivery engine could then query a content delivery network having a database of images and determine if an AI (Artificial Intelligence)-optimized image already exists in the database. Again, this image will meet the conditions that are considered to be an optimal image configuration for that specific user device/browser. If an image exists, it is delivered to the user device through the content delivery network, and specifically by an edge or node.

Also, as noted throughout, the database can include numerous permutations of parameters for the images hosted on a particular website. This can include having pre-generated, a plurality of versions for each image, each having a different size/resolution.

If no image exists in the database that matches the needs of a specific user device, the adaptive content delivery engine can create one that is exactly formatted and resized to the capabilities of the user device. In some instances, approximate or suitable alternative images that approximate the capabilities of the user device can be delivered to ensure that the user does not experience latency or other errors while the custom format image is being created. As noted, the newly optimized file can be generated, or even the original file, with its original formatting, can be delivered.

In some embodiments, the image can be subject to further transformations based on end user preferences. For example, the adaptive content delivery engine 108 may select a particular image format when specified by the user to do so. In another example, the user may choose to receive all images or video in grayscale. According to some embodiments, the adaptive content delivery engine can generate and display a user interface that allows users or administrators to modify or fine-tune parameters for the adaptive content selections. That is, the UI can include selectable parameters that allow a user to define the format, type, size, resolution, and so forth for content received from the adaptive content delivery engine.

In some instances, an original media file can be downloaded and analyzed using AI, and then a new file can be recreated and stored in the database for future use. In essence, each time a file is recreated for a specific device, with unique capabilities, this regenerated version of that image is then stored in the database so that it may be delivered to a similar device in the future. Essentially, the database is continually updated and functions as a cache of many versions of many images. In some instance, the database can be dynamically updated to integrate new images and purge less optimized images. Also, images that are not frequently requested or not properly optimized can be purged. For example, this can include an image that was created for an image format no longer in use, or an image with a resolution that is no longer needed, or an image for which a better optimization has been achieved.

Figure 3:
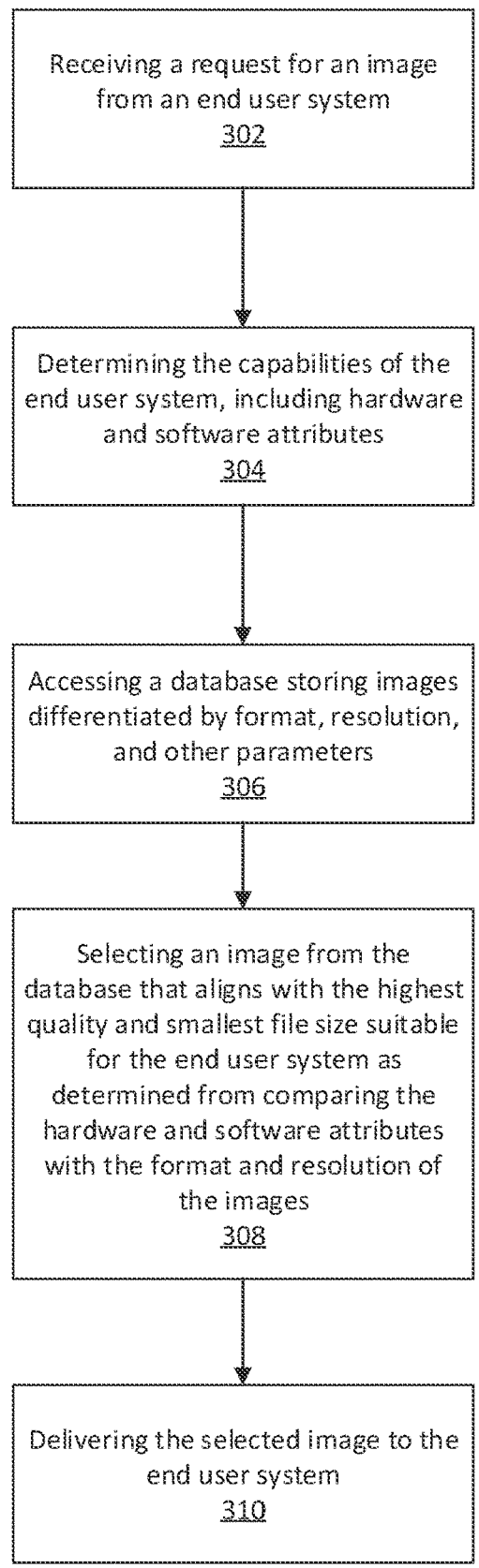
FIG. 3 is a flow diagram of an example method for delivering optimized content.

FIG. 3 is a flow diagram of example method for delivering optimized content. The method includes a step 302 of receiving a request for an image from an end user system. In the presented methodology, step 302 involves the reception of a digital request for a specific image initiated by an end-user system. This is often an initial interaction between the client's system and the serving platform, often facilitated through RESTful API calls or similar web service interfaces.

The method can include a step 304 of determining the capabilities of the end user system, including hardware and software attributes. In this step, the platform evaluates the technical specifications of the end-user system. This encompasses both hardware and software attributes, which can include—but are not limited to—the device's Central Processing Unit (CPU), Graphics Processing Unit (GPU), memory, screen resolution, and operating system version. Additionally, the browser's user-agent string might be parsed to deduce browser type, version, and capabilities, given its direct impact on media rendering.

In some embodiments, the method includes a step 306 of accessing a database storing images differentiated by format, resolution, and other parameters. For step 306, the methodology interfaces with a systematically structured database, wherein images are classified based on a myriad of attributes like format (e.g., JPEG, PNG, WebP), resolution (e.g., 1080×1920, 4K), and potentially other parameters such as color depth, compression level, and aspect ratio.

The method can include a step 308, where based on the capabilities, the method includes selecting an image from the database that aligns with the highest quality and smallest file size suitable for the end user system. In step 308, leveraging the previously discerned capabilities of the end-user system, an algorithm is employed by the adaptive content delivery engine to retrieve an image from the database. The chosen image endeavors to strike a balance between visual quality and optimal file size, ensuring efficient transmission and optimal rendering on the end-user system. This algorithm can utilize machine learning or heuristic-based approaches, integrating considerations such as bandwidth constraints and anticipated latency.

In some embodiments, the method includes a step 310 of delivering the selected image to the end user system. Finally, step 310 encapsulates the delivery mechanism, where the selected image is transmitted to the end-user system. Modern Content Delivery Network (CDN) architectures might be utilized here, ensuring edge delivery for reduced latency. Additionally, image delivery could be optimized through protocols like HTTP/3 or WebSockets for streamlined and efficient data transfer.

In relation to the adaptive content delivery mechanism delineated in the prior paragraphs, it is evident that the platform employs a multi-faceted approach to media optimization. The incorporation of Artificial Intelligence (AI) significantly augments the precision of image selection, tailored for individual user environments. As technologies such as Progressive Web Apps (PWAs) and Service Workers continue to evolve, the potential for media optimization in real-time web environments becomes even more pronounced.

Moreover, the described methods are cognizant of the variable nature of web media consumption. Hence, the dynamic adjustment of media links, the availability of various parameters for customization, and the ability to integrate scripts seamlessly into web infrastructure illustrate the adaptive content delivery engine's comprehensive capability to cater to diverse end-user systems with heterogeneous specifications.

In the domain of web media optimization, the aforementioned parameters—like f_auto, mxw_n, and c_auto—are used to adapt media to best suit different viewing contexts. As web standards and browser capabilities evolve, the logic employed by the adaptive content delivery engine continually updates and refines these parameters.

Finally, the data-driven insights gained from user interactions, coupled with AI-enhanced decision-making processes, enable future scalability and enhanced user experience optimization in ever-evolving digital landscapes.

With respect to determining the capabilities of the end-user system, this determination process entails recognizing and classifying the type of system/device/browser employed by the end-user. The system classification could range from mobile devices, characterized by their compact form factors and touchscreen interfaces, to laptops which offer a balance between mobility and computing power, to desktops that are often associated with robust performance and larger screen real estate. Recognizing the type of system is important, as it provides insights into the optimal image formats, resolutions, and rendering strategies suitable for each device.

The capability determination can involve a comprehensive analysis. This analysis aids the engine in predicting future image requests. This predictive modeling is built upon analyzing current demand patterns, such as the frequency of specific image requests, the trending image formats, or the most common end-user system types in use. By anticipating future requests, the system can pre-emptively prepare versions, ensuring that the required resources are readily available when called upon.

Another advantageous mechanism involves caching the image that has been delivered. Caching is a technique of storing data in high-speed storage locations to ensure faster access for subsequent requests. By caching the delivered image, the system can expedite future image requests originating from end-user systems that share similar characteristics or configurations. This not only enhances user experience by reducing latency but also alleviates the load on the main server, making the entire process more efficient.

Also, the image delivery process is further optimized based on user preferences. When the selected image is being delivered to the end-user system, it may undergo various transformations to best fit the user's unique needs and preferences. These transformations can range from resizing and cropping to color adjustments and overlay application. By tailoring the image to user preferences, the system ensures a more personalized and satisfactory user experience, further enhancing the overall value of the service.

Figure 4:
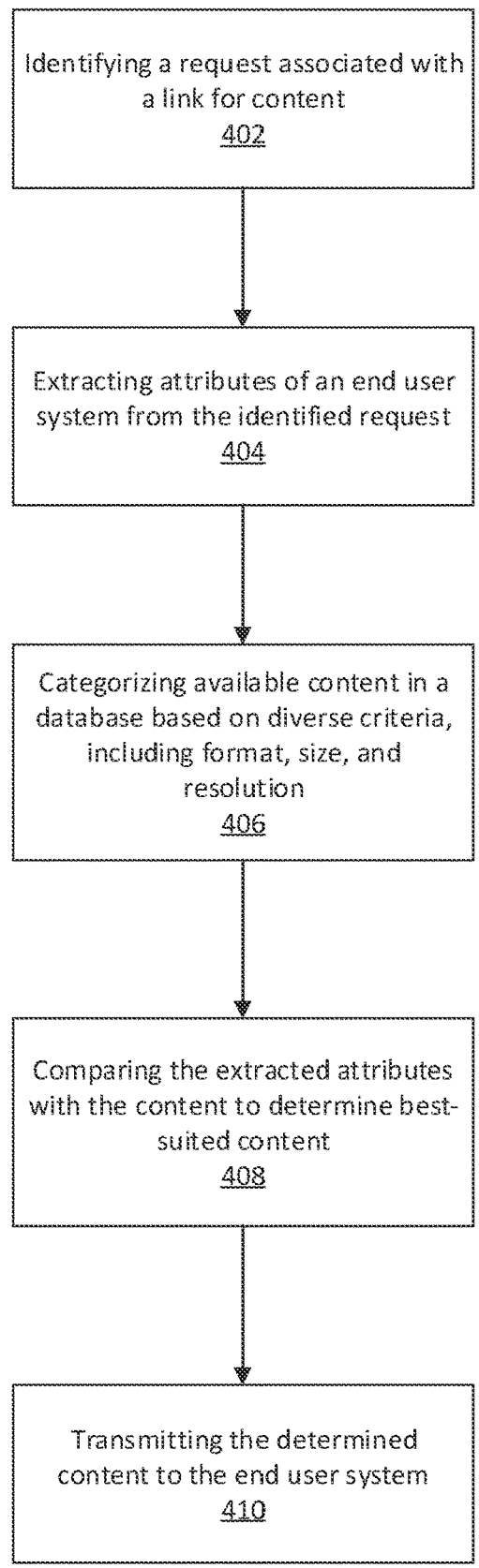
FIG. 4 is another flow diagram of a method for adaptive content selection.

FIG. 4 is another flow diagram of a method for adaptive content selection. In step 402 the method includes identifying a request associated with a link for content. Within the initial phase of the process, step 402 of the method encompasses the act of pinpointing or discerning a particular request. This request is inherently associated with a specific link that directs or points to particular content. Such identification might involve parsing incoming data packets, inspecting header fields, or analyzing payload content to ensure that the request corresponds to a link.

The method can include a step 404 of extracting attributes of an end user system from the identified request. Progressing further, step 404 delves into the earlier identified request. This step is characterized by the extraction or retrieval of distinctive attributes or parameters that are inherent to the end user's system. This might entail interpreting user-agent strings, examining metadata, or utilizing other identification protocols to glean insights about the specifications, capabilities, or limitations of the accessing device.

Also, the method includes a step 406 of categorizing available content in a database based on diverse criteria, including format, size, and resolution. Step 406 of the method is directed to organizing, classifying, or categorizing the plethora of available content within a centralized or distributed database. This categorization is not arbitrary but is structured based on a multitude of criteria that impart significance in content delivery. For instance, the content may be arranged based on its native format (JPEG, PNG, GIF, etc.), its dimensions or physical size, and its resolution or pixel density. Such categorization facilitates quicker retrieval and aids in efficient content matching in subsequent steps.

The method can include a step 408 of comparing the extracted attributes with the content to determine best-suited content. With the knowledge of both the end user's system attributes and the organized content, step 408 includes a comparative analysis. The method involves juxtaposing or cross-referencing the extracted attributes from the user's system with the content categories established previously. This step includes discerning or determining which content variant is optimally suited for the end user, ensuring compatibility, optimal rendering, and user satisfaction. Algorithms or heuristic models are employed by the engine to make an informed selection based on this comparative analysis.

Finally, the method can include a step 410 of transmitting the determined content to the end user system. Step 410 operationalizes the transmission or delivery of the ascertained content to its destination—the end user's system. Unlike mere data transfer, the transmission of the content by the CDN ensures that the content is transmitted efficiently, securely, and in a manner congruent with the capabilities of the receiving system. This can involve employing suitable transmission protocols, compressing data for efficient bandwidth usage, or even utilizing content delivery networks (CDNs) to expedite the delivery process.

In reference to the method described, one notable feature is the specificity and breadth of the attributes extracted. The method can glean granular attributes from the end user system. This encompasses details like the operating system—which can be a linchpin for compatibility and performance considerations. Further, the browser type is identified, which is crucial given the variances in rendering and support for specific technologies across different browsers. Additionally, the method discerns any rendering software present on the end user system, offering insights into how content, especially multimedia, might be processed and displayed.

Further, the transmission process encapsulates more than just the mere act of sending content. The method inherently aims for efficiency in user experience. One advantageous aspect of this is the evasion of redirections, which can be a source of latency and user frustration. By circumventing these redirections, the method not only accelerates content delivery but also offers a more streamlined and seamless browsing or access experience for the end user.

An added layer of processing is incorporated during the content categorization process. Beyond the typical criteria, the method considers the temporality of content. Specifically, the adaptive content delivery engine/CDN incorporates a strategy of analyzing recent updates, revisions, or modifications made to the content. This ensures that the content isn't just relevant in format or size but is also contemporary and reflective of the most updated version available, which is crucial for accuracy and relevance in various applications.

The categorization mechanism employed demonstrates intricate granularity. Content isn't just categorized; it's dissected based on its inherent dimensions, be it spatial dimensions or file size. The categorization mechanism assesses the content's compatibility across a spectrum of devices, ensuring that irrespective of whether an end user accesses from a smartphone, tablet, or a desktop, the content remains optimal and tailored for that specific interface.

Figure 5:
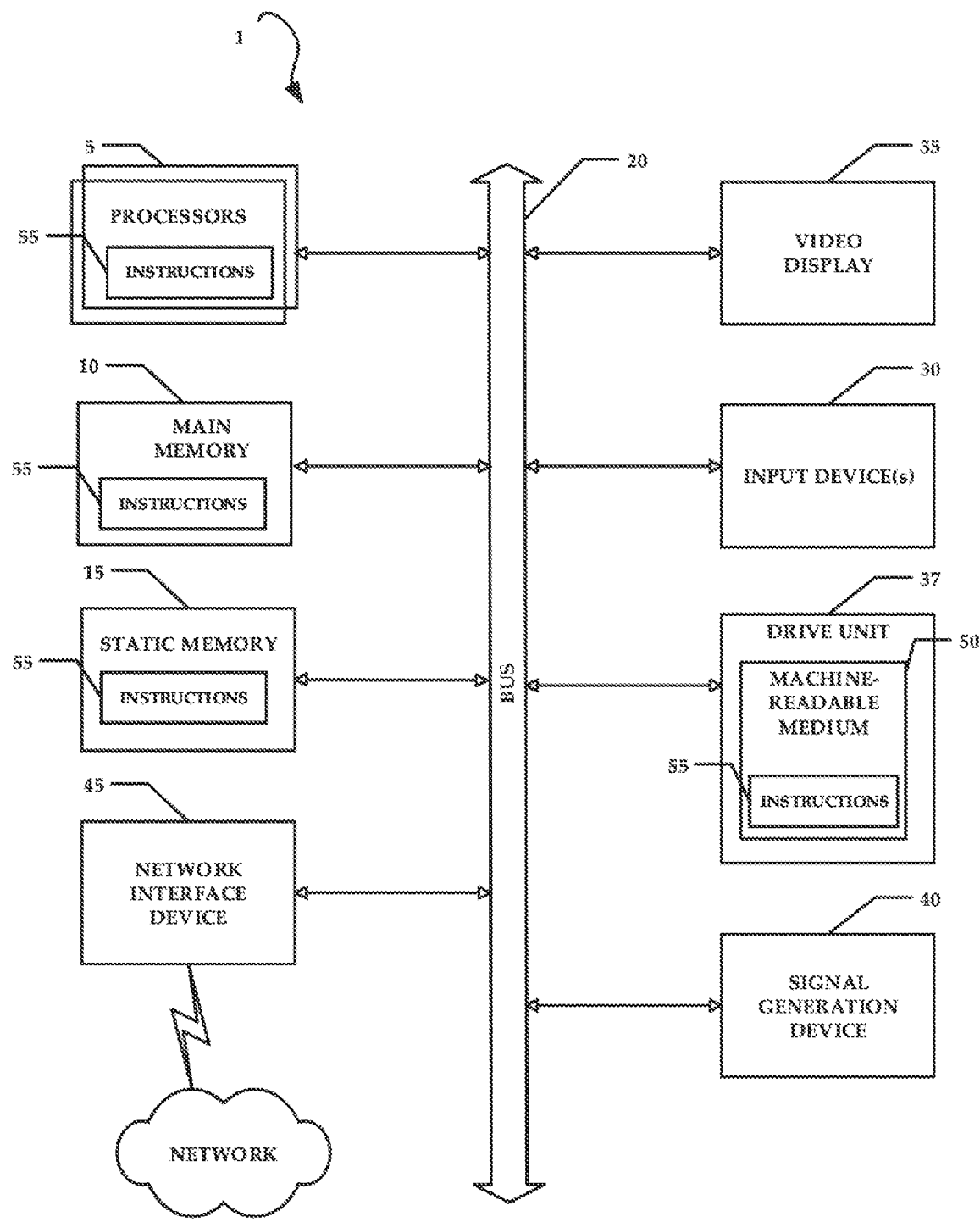
FIG. 5 is a diagrammatic representation of an example machine in the form of a computer system that can be used to implement aspects of the present technology.

FIG. 5 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1 includes a processor or multiple processor(s) 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 1. The main memory 10 and the processor(s) 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Where appropriate, the functions described herein can be performed in one or more of hardware, software, firmware, digital components, or analog components. For example, the encoding and or decoding systems can be embodied as one or more application specific integrated circuits (ASICs) or microcontrollers that can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In this description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

What is claimed is:

1. A computer-implemented method for delivering optimized content, the method comprising:
    embedding an optimization process directly into an end user system further comprising displaying a plurality of pre-existing media links within an end user system interface such that each media link defines a path to a corresponding media item, each media link incorporating one or more transformation parameters controlling media optimization operations;
    receiving, at a remote content delivery engine, a request from the end user system for a media item;
    determining, by the remote content delivery engine, hardware and software attributes of the end user system by extracting the one or more transformation parameters from the received request;
    accessing, by the remote content delivery engine, a database storing a plurality of pre-existing media items, whereby each media item is differentiated by at least format and resolution;
    selecting, by the remote content delivery engine, an optimized media item from the database that aligns with a highest quality and a smallest file size suitable for the end user system as determined from comparing the hardware and software attributes of the end user system with the format and resolution of the plurality of pre-existing media items that satisfy the one or more transformation parameters defined in the received request; and
    delivering the selected media item to the end user system via a network.

2. The method of claim 1, wherein determining capabilities further includes recognizing a type of the end user system, such as a mobile device, laptop, or desktop.

3. The method of claim 2, further comprising caching the delivered media item for expedited future requests from similar end user systems to the end user system.

4. The method of claim 2, wherein the database includes a plurality of versions of a plurality of media items for a website.

5. The method of claim 3, wherein delivering the selected media item further involves applying a transformation based on end user preferences.

6. The method of claim 1, wherein the one or more transformation parameters are selected from the group consisting of media format selection, image dimension modification, image cropping, video display characteristics, image color adjustment, image positioning, and grayscale conversion.

7. The method of claim 1, wherein the media items are selected from the group consisting of images and videos.

8. A computer-implemented method for optimizing media content delivery, the method comprising:
    embedding an optimization process directly into an end user system further comprising displaying a plurality of pre-existing media links within an end user system interface such that each media link defines a path to a corresponding media item, each media link incorporating one or more transformation parameters controlling media optimization operations;
    identifying, by a remote content delivery engine, a request associated with one of the plurality of pre-existing media links for content;
    extracting, by the remote content delivery engine, attributes of an end user system from the identified request based on the one or more transformation parameters incorporated in the requested media link;
    categorizing available content in a database based on at least format, size, and resolution;
    comparing the extracted attributes based on the one or more transformation parameters with the categorized content to determine optimized content, comprising a highest quality and smallest file size; and
    transmitting, by the remote content delivery engine, the determined optimized content to a network for delivery to the end user system.

9. The method of claim 8, wherein the extracted attributes include an operating system, browser type, and rendering software present on the end user system.

10. The method of claim 8, wherein transmitting the determined optimized content avoids redirections, providing a streamlined user experience.

11. The method of claim 9, wherein categorizing the available content further involves analyzing recent updates to the content.

12. The method of claim 10, wherein categorizing the available content involves assessing content dimensions and compatibility with a range of devices.

13. The method of claim 10, further comprising generating and displaying a user interface that lets users or administrators modify or fine-tune parameters for adaptive content selections.

14. The method of claim 8, wherein the one or more transformation parameters are selected from the group consisting of media format selection, image dimension modification, image cropping, video display characteristics, image color adjustment, image positioning, and grayscale conversion.

15. The method of claim 8, wherein the media items are selected from the group consisting of images and videos.

16. A content delivery system, comprising:
    an adaptive content delivery engine configured to:
        determine capabilities of a requesting end user system, defined by an optimization process embedded directly into the end user system, the optimization process further comprising displaying a plurality of pre-existing media links within an end user system interface of the requesting end user system such that each media link defines a path to a corresponding media item, each media link incorporating one or more transformation parameters controlling media optimization operations;

receive a request from the end user system for a media item;

determine hardware and software attributes of the end user system by extracting the one or more transformation parameters from the request received;

access a database storing a plurality of pre-existing media items, wherein each media item is differentiated by at least format and resolution;

select an optimized media item from the database that balances a highest quality and a smallest file size for the end user system, as determined from comparing the hardware and software attributes of the end user system with the format and resolution of the plurality of pre-existing media items that satisfy the one or more transformation parameters defined in the received request; and provide the optimized media item to a network for delivery to the end user system.

17. The system of claim 16, wherein the adaptive content delivery engine is additionally configured to assess network conditions and bandwidth available to the end user system.

18. The system of claim 16, wherein the media items are selected from the group consisting of images and videos.

19. The system of claim 18, wherein the adaptive content delivery engine is adapted to operate within a distributed network, and the adaptive content delivery engine is configured to communicate with nodes and edges of the distributed network, for efficient content dissemination.

20. The system of claim 19, wherein a database undergoes dynamic updates to integrate new media items and purge less optimized media items.

21. The system of claim 16, wherein the adaptive content delivery engine is configured to assess network conditions and bandwidth of the end user system when sizing the media item.

22. The system of claim 16, wherein the adaptive content delivery engine, while selecting the media item, considers both a finest resolution tailored for the end user system and a most compact file size amongst available media items.

23. The system of claim 16, wherein the adaptive content delivery engine is integrated with nodes and edges of a content delivery network for efficient content dissemination.

24. The system of claim 16, wherein the one or more transformation parameters are selected from the group consisting of media format selection, image dimension modification, image cropping, video display characteristics, image color adjustment, image positioning, and grayscale conversion.

* * * * *